United States Patent [19]
Darcie et al.

[11] Patent Number: 5,907,417
[45] Date of Patent: May 25, 1999

[54] PASSIVE OPTICAL NETWORK WITH DIAGNOSTIC LOOP-BACK

[75] Inventors: Thomas Edward Darcie, Middletown; Nicholas J. Frigo, Atlantic Highlands; Patrick P. Iannone, Edison, all of N.J.

[73] Assignee: Lucent Technologies Inc., Murray Hill, N.J.

[21] Appl. No.: 08/871,466

[22] Filed: Jun. 9, 1997

Related U.S. Application Data

[62] Division of application No. 08/366,849, Dec. 30, 1994, Pat. No. 5,680,234.

[51] Int. Cl.[6] ................................................. H04B 10/08
[52] U.S. Cl. ............................................ 359/110; 359/168
[58] Field of Search .................................... 359/110, 125, 359/127, 166, 168; 385/31–32

[56] References Cited

U.S. PATENT DOCUMENTS 5,367,396   11/1994   Sotom et al. ........................... 359/110

*Primary Examiner*—Kinfe-Michael Negash

[57] ABSTRACT

A passive optical network is provided that spectrally slices optical signals transmitted in both upstream and downstream directions utilizing wavelength division multiplexing routing. The passive optical network preferably includes a broadband optical signal source at both ends to provide signals that are spectrally sliced according to optical frequency. The downstream information may be transmitted in a conventional data format. The upstream transmissions may be segregated by subcarrier multiplexing, time scheduling or wavelength division multiplexing. At the subscriber end of the network there is an optical network unit which includes a device coupling the downstream fiber to the upstream fiber. Such coupling allows the passive optical network to perform enhanced diagnostic tests.

7 Claims, 2 Drawing Sheets

PASSIVE OPTICAL NETWORK WITH DIAGNOSTIC LOOP-BACK

CROSS REFERENCE TO RELATED APPLICATION

This is a divisional of application Ser. No. 08/366,849 filed on Dec. 30, 1994, now U.S. Pat. No. 5,680,234.

FIELD OF THE INVENTION

The present invention relates to a wavelength-division multiplexing passive optical network that utilizes bi-directional, optical spectral slicing for two-way transmission.

BACKGROUND OF THE INVENTION

Optical networks, including passive optical networks, have been proposed as a copper plant replacement for local telephone service. Passive optical networks direct optical signals between a central office or host digital terminal, and network terminal equipment. Passive optical networks require no power or processing in the field to direct such optical signals between network equipment.

Typically, a passive optical network includes a plurality of optical paths extending from the central office to a plurality of remote nodes. Each remote node is further optically connected to a plurality of optical network units, which may suitably be subscribers' terminal equipment. Such networks transmit downstream optical signals from the central office to each remote node, where the signal is then passively split and distributed to the optical network units. In the upstream direction, in other words, toward the central office, the optical network units transmit optical signals to the remote node, where they form a multiplexed signal that is provided to the central office. Lasers are generally used to generate light used to form the transmitted light signals. For a general discussion of such networks, see, for example, Stern et al., "Passive Optical Local Networks For Telephony Applications And Beyond", *Electronics Letters*, Vol. 23, pp. 1255–57 (1987).

Downstream signals destined for a plurality of optical network units may generally be provided from the central office to the remote nodes using one of two signal arrangements, broadcast signals and switched signals. In a broadcast signal arrangement, a central office broadcasts a downstream optical signal to the remote nodes using, for example, a time-division multiplexing (TDM) protocol. A TDM signal typically includes a frame of information subdivided into time slots, each time slot assigned to an individual optical network unit (ONU). While the entire TDM signal is broadcast to each ONU, each ONU only uses the data from its assigned time slot. In a switched architecture, the central office transmits a separate signal to each ONU. For example, the central office may transmit wavelength division multiplexed (WDM) signals wherein each ONU or subscriber is assigned a wavelength band. In a WDM network, signals destined for each remote node, and ultimately, each ONU, are created by modulating light at distinct wavelengths at the central office. The modulated light signals are then multiplexed onto a fiber and directed to the remote node. A wavelength division demultiplexer (WDM) at the remote node splits and distributes the downstream signals to the ONUs as a function of wavelength. One notable difference between the two architectures is that in broadcast signal systems, the data signal for all ONUs is provided to each ONU, which results in wasted power and lacks signal privacy. In WDM signals, each ONU sees only its own data signal, which is more power efficient and private.

RITE-Net™ is a WDM network in which a central office provides multiplexed optical signals encoded with information at specific wavelengths to each remote node. At each remote node, the downstream signals are routed by wavelength to the ONUs. At each ONU, the received light is overmodulated with upstream information and looped back through the remote node to the central office. To this end, a modulator at the optical network unit imprints information on a portion of the downstream signal which is then directed back to the remote node. The RITE-Net™ network not only has the privacy and efficiency advantages of WDM optical communication, but further has the advantage of not requiring a light source at the ONU. From a network standpoint, it is advantageous that the ONUs cannot generate their own light signals. RITE-Net™ is described in commonly-owned U.S. patent application Ser. No. 08/029,724, filed Mar. 1, 1993, and incorporated herein by reference.

At present, however, the multiwavelength laser and modulator technologies that are preferably employed in a RITE-Net™ network are still being developed. In the interim, broadcast TDM networks have been proposed that utilize widely available technology.

One design consideration in passive optical networks is the facility for diagnostics which may be used to identify and locate network component failures, such as fiber cuts or transmission equipment failure. For cost efficiency, passive optical networks, including both broadcast signal and switched signal networks, are preferably capable of performing diagnostic operations from the central office location. One known diagnostic operation that may be performed at the central office is the optical time domain reflectometry ("OTDR") test, which is described, for example, in J. M. Senior "Optical Fiber Communications" pp. 822–27 (Prentice Hall 1992).

In the OTDR test, a light pulse is provided at one end of the fiber, typically at the central office. Then, a measure of the light reflected back due to backscatter effects is taken. The measure of backscattered light provides an indication of the status of the optical link to the node. In practice, if a particular ONU cannot communicate with the central office, the OTDR test may be used to determine if there is a fiber cut, and if so, its approximate location.

The OTDR test in some circumstances does not adequately identify a network failure. Consider, for example, a situation in which a particular ONU is not communicating. In such a situation, the cause may be an optical path problem such as a fiber cut, or a failure in the ONU transmission or reception equipment. If the OTDR test is performed and the results indicate that their may be a fiber break at or near the ONU, there is no way to distinguish between a fiber failure near the ONU or an ONU transmission or reception equipment failure.

SUMMARY OF THE INVENTION

The present invention provides a passive optical network, and components thereof, that provide improved facilities for network diagnostic operations. More particularly, the passive optical network of this invention includes a central office or host computer in optical communication with one or more optical network units wherein both the central office and optical network units contain broadband optical sources and receivers for transmitting/receiving optical data. The network includes a loop-back feature at one or more ONUs that not only facilitates improved diagnostic operations, but also provides further compatibility with future network upgrades.

To perform diagnostic operations, the central office provides a downstream diagnostic signal to the ONU through the remote node. The ONU then couples back or loops back the diagnostic signal so that it propagates back to the remote node. At the remote node, a wavelength grating router contained therein multiplexes the coupled-back signal onto the upstream fiber leading to the central office. At the central office, the coupled-back signal is used to determine information about the status of the passive optical network. In one embodiment, diagnostic transmission and receiving equipment is located at the central office and coupled to the downstream and upstream fibers using access ports. In this diagnostic mode of operation, optical path failures may readily be distinguished from ONU equipment failures.

Other features and advantages of the present invention will become readily apparent to those of ordinary skill in the art by reference to the following detailed description and accompanying drawings.

DETAILED DESCRIPTION

Figure 1:
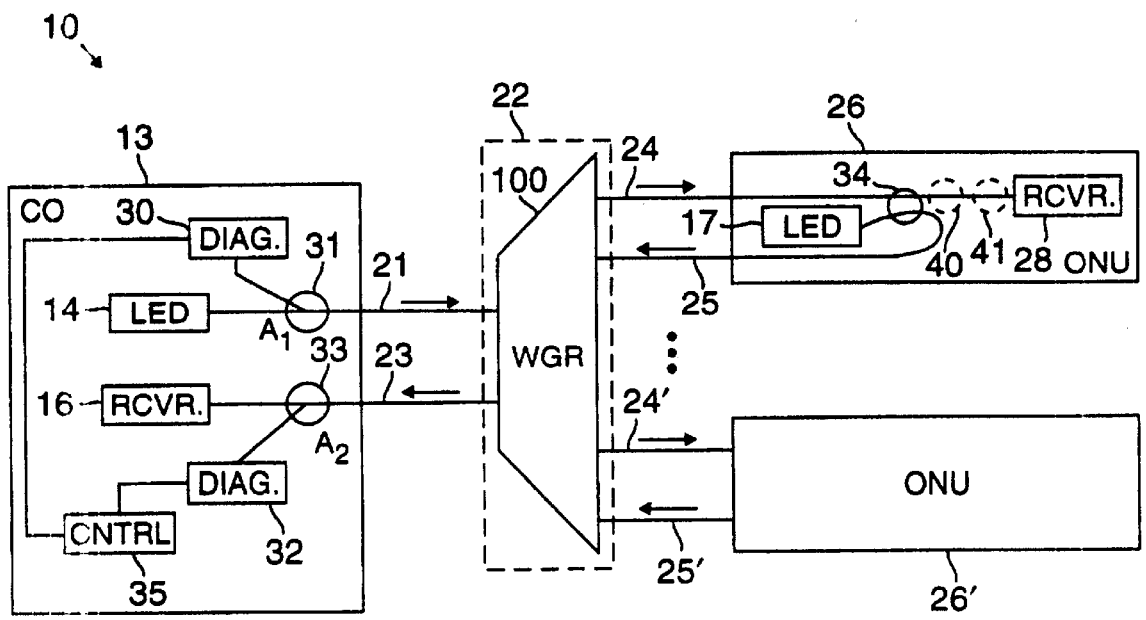
FIG. 1 shows an exemplary embodiment of a passive optical network using bi-directional optical spectral slicing and having a loop-back feature according to the present invention.

FIG. 1 shows an exemplary embodiment of a passive optical network 10 using bi-directional optical spectral slicing and having a loop-back feature in accordance with the present invention. The network 10 includes a central office 13, a remote node 22 and a plurality of optical network units ("ONUs"), shown here as exemplary ONUs 26 and 26'. The central office may suitably be connected to a plurality of remote nodes similar to the remote node 22. The central office 13 includes a broadband light source transmitter 14 and an optical receiver 16. The transmitter may suitably be a 1.3 $\mu$m wavelength light emitting diode (LED) transmitter. A downstream fiber 21 connects the transmitter 14 to the remote node 22, and an upstream fiber 23 connects the receiver 16 to the remote node 22. The central office 13 preferably further includes a diagnostics transmitter 30 connected through access port 31 to the downstream fiber 21, and a diagnostics receiver 33 connected through access port 32 to the upstream fiber 23. A diagnostics controller 35 is operably connected to the diagnostics transmitter 30 and the diagnostics receiver 33.

Figure 2:
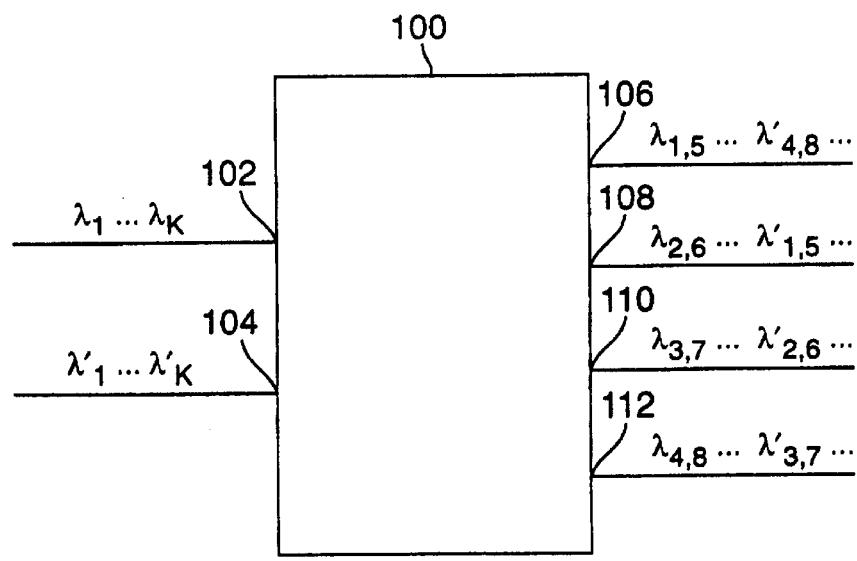
FIG. 2 shows a wavelength grating router which may be used in the passive optical network of FIG. 1.

The remote node 22 preferably includes a wavelength grating router (WGR) 100. The WGR 100 operates primarily as a multiplexer and demultiplexer. The WGR 100, however, also has periodic and routing properties that are advantageous in the present invention. FIG. 2 shows some relevant input/output properties of the WGR 100 employed in the remote node 22. The details of the internal operations and construction of a suitable WGR may be found in Dragone, "An N×N Optical Multiplexer Using a Planar Arrangement of Two Star Couplers," *IEEE Phot. Tech. Letters,* which is incorporated by reference herein. The exemplary WGR 100 has first and second input ports 102 and 104, respectively, and first through fourth output ports 106, 108, 110 and 112, respectively. The actual number of input and output ports may vary according to application. Furthermore, the terms "input" and "output" are used with respect to the ports of the WGR 100 for clarity of discussion only, and it is noted that the properties of the WGR 100 described below are reciprocal.

A primary property of the WGR 100 is its ability to perform multiplexing and demultiplexing. For example, the WGR 100 is operable to demultiplex a WDM signal received at either of the input ports 102 and 104 and provide its wavelength components to the output ports 106 through 112. When used herein, the phrase "wavelength component" means a wavelength band of optical energy, and not necessarily one discrete wavelength. A further property of the WGR 100 is that the configuration of wavelength components on the output ports 106 through 112 depends upon the input at which the WDM signal is received. Each input port produces a unique output configuration. Thus, if a WDM signal provided to input port 102, the WGR 100 will provide a different configuration of wavelength components on the outputs 106 through 112 than if the same signal is provided to input port 104.

The WGR 100 also has a periodic property such that if an input signal has a wider optical spectrum than the free spectral range of the WGR 100, the WGR 100 will re-use output ports in a periodic or cyclical fashion. In such a case, the WGR 100 produces an output configuration in which a plurality of essentially evenly spaced wavelength bands or components are provided to each output port. For example, consider a WDM signal INPUT1 having a spectrum comprising wavelength components $\lambda_1$ through $\lambda_K$ where K>>4. The notation $\lambda_n$ represents a particular wavelength band n having a particular optical spectrum. For the input signal INPUT1, the WGR 100 provides not only $\lambda_1$, but also $\lambda_5$, $\lambda_9$ and so forth, in other words, every fourth wavelength component less than or equal to $\lambda_K$, to the output port 106. Likewise, the WGR 100 provides $\lambda_2$, $\lambda_6$ and so forth to the output port 108; $\lambda_3$, $\lambda_7$ and so forth to the output port 110; and $\lambda_4$, $\lambda_8$ and so forth to the output port 112.

Consider a second signal INPUT2 having essentially the same respective frequency components $\lambda'_1 \ldots \lambda'_K$. If INPUT2 is provided at the input 104, the WGR 100 provides a different periodic configuration of wavelength components to the outputs 106 through 112, as shown in FIG. 2. In general, the spectrum at a particular output port j may be expressed as $\lambda_{j+mN}$, where N is the total number of output ports, and m is an integer that varies depending upon the bandwidth of the input light.

The advantages of these properties of the WGR 100 will become apparent in the continuing discussion of the network 10 of FIG. 1.

Returning to FIG. 1, the exemplary ONU 26 includes a transmitter 17, a receiver 28, and a coupling device 34. The ONU may suitably be formulated as one integrated device, such as, for example, a device formed from a Indium Phosphide (InP) substrate. The transmitter 17, which may suitably be a broadband light source, such as an LED, is connected to the remote node 22 through an upstream fiber 25. For reasons discussed further below, the transmitter 17 preferably has an optical spectrum that is substantially different from the central office transmitter 14. For example, if the central office transmitter 14 generates optical signals in the 1.3 μm wavelength range, the ONU transmitter 17 may suitably transmit signals in the 1.5 μm wavelength range.

The ONU receiver 28 is connected to the remote node 22 through a downstream fiber 24. The coupling device 34, which may suitably be a 90/10 optical coupler or other asymmetric optical coupler, is configured to couple the downstream fiber 24 with the upstream fiber 25. This allows signals propagating downstream to be coupled onto the upstream fiber 25. The ONU 26 may further include a diagnostic blocking filter 40 and a reverse blocking filter 41 located between the coupling device 34 and the receiver 28.

In a first mode of operation, the system 10 operates to provide communication signals between the central office 13 and the ONU 26. Such operation of the invention is also discussed in our co-pending parent application, "A Wavelength Division Multiplexing Passive Optical Network with Bi-Directional Optical Spectral Slicing", U.S. patent application Ser. No. 08/326,576. In this mode, the central office 13 transmits downstream communication signals to the ONU 26 and the other ONUs, while the ONUs transmit upstream signals to the central office 13. The downstream signals are time-division multiplexed, with each ONU being assigned one or more time slots. When a downstream signal arrives at the remote node 22, the WGR 100 contained therein insures that each downstream port receives wavelength slices of the transmitted signal particular to the optical network unit to which it is directed.

The periodicity of the WGR 100 insures that each port receives a signal containing approximately the same optical power, assuming the wavelength spread of transmitter 14 is large relative to the WGR's free spectral range (FSR). In particular, if there are N optical ports, $\lambda_{j+mN}$ denotes the wavelength bands or "comb of wavelengths", that will appear at port j for integers of m. If the FSR is small compared to the spectrum of the incoming light, then each port j receives approximately the same power $P_j$. Each $P_j$ is equal to the scaled central office output power ($P_0$) over N, and may be expressed as, $P_j \approx \alpha P_0/N$, where α is a constant that incorporates various sources of excess loss. In contrast, in a conventional WDM, only $\alpha_j$ will appear at port j, resulting in a lower value of $P_j$.

The ONU 26, as well as other ONUs, transmit broadband upstream signals to the remote node 22 using a time division multiple access ("TDMA") multiplexing protocol discussed further below. In accordance with the properties of the WGR 100, the remote node spectrally slices and then multiplexes the upstream signals such that the upstream signal from each ONU occupies a particular bandwidth. For a particular ONU 26, an upstream optical signal generated within the transmitter 17 at the optical network unit 26 is directed through the fiber 25 to the remote node 22. The reverse blocking filter 41 substantially blocks the transmitted upstream signal from being coupled back into the receiver 28. For the exemplary embodiment, the filter 41 may be operable to block 1.5 μm wavelength signals used for upstream transmission, while still allowing 1.3 μm wavelength downstream signals to pass.

Due to the properties of the WGR, the remote node 22 combines a sliced version of the LED spectrum generated within each optical network unit onto the optical fiber 23 and directs it to the central office. In other words, only a portion of the spectrum of the upstream signal from each ONU is directed to the central office 13. The sliced spectra are automatically interleaved by the WGR such that the optical frequencies from distinct optical network units do not overlap, thereby preventing, for example, unwanted beat noise.

The upstream signals from each of the ONUs are assigned to a particular time slot in the TDMA architecture, as is known in the art. Such assignment of time slots allows the central office 13 to segregate the different ONUs' signals. Alternatively, other methods may be used to differentiate each of the ONUs' upstream signals at the central office. One such method includes subcarrier multiplexing (SCM). SCM is an arrangement where optical signals transmitted from each optical network unit, such as the ONU 26, are coded into unique RF subcarriers that modulate the ONU-generated broadband light. Another method of differentiating the upstream signals from different ONUs is wavelength division multiplexing. WDM signals, due to the construction of the WGR, are naturally segregated by wavelength and are therefore amenable to demultiplexing using a wavelength division multiplexer. As a result, at the central office, the light received from the remote node is either segregated in time, as in the case of TDMA scheduling, by RF frequency, as in the case of SCM, or by wavelength band, as in the case of WDM, and processed accordingly. Other known methods may also be employed, such as those that code information signals.

It is noted that the coupling device 34 may couple a portion of the downstream signal to the upstream fiber 25. This coupled-back signal should not undesirably interfere with upstream communication signals because, as discussed above, the downstream signals and upstream signals are preferably transmitted at substantially different wavelengths, such as, for example, 1.3 μm and 1.5 μm, respectively. Furthermore, the signal strength of the coupled-back signal will be substantially less than the strength of the transmitted upstream signal and therefore should not cause unwanted beat noise.

In accordance with the present invention, the passive optical network 10 exploits the loop-back feature in the optical network unit 26 to obtain information about the operation of the network. For example, the network 10 uses the loop-back feature in performing various diagnostic tests. One such test is employed to determine the optical continuity between the central office 13 and the ONU 26. In general, the diagnostic transmitter 30 under the control of the diagnostic controller 35 provides a diagnostic signal to the downstream fiber 21 through the access port 31. The diagnostic signal preferably has a wavelength band that corresponds to the ONU 26 or, in other words, a wavelength that the remote node 22 will route to the downstream fiber 24. Because of this choice of wavelength band, the other downstream fibers will not receive the diagnostic signal. Furthermore, to prevent interference with communication signals, it is desirable to use a diagnostic signal having an optical spectrum outside the wavelength band of both the upstream and downstream communication signals. Because of the periodic properties of the WGR, an optical wavelength may be selected that is both 1) outside the range of both upstream and downstream transmissions and 2) routed exclusively to the ONU 26.

The fiber 24 provides the diagnostic signal to the ONU 26. The diagnostic signal is coupled back via the coupler 34 to the upstream fiber 25. Although the downstream diagnostic signal also propagates to the receiver 28, the diagnostic blocking filter 40 preferably blocks the signal from reaching the ONU receiver 28. Alternatively, instead of using the blocking filter 40, the diagnostics transmitter 30 (and receiver 32) may utilize a unique code division multiple access ("CDMA") coding key to code the test signal. The resulting coded signal is then invisible to the ONU receiver 28. In another alternative, the diagnostics transmitter 30 and receiver 32 may utilize an RF subcarrier for the diagnostic signal in order to render the signal invisible to the receiver 28.

In any event, the coupled-back diagnostic signal propagates over the fiber 25 to the remote node 22 where it is multiplexed into the upstream fiber 23. The signal propagates through the upstream fiber 23 to the access port 33. The access port 33 selectively couples the wavelength of the coupled-back diagnostic signal to the receiver 32. The diagnostics receiver 32, under the control of the diagnostics controller 35, may then measure the signal strength or other aspects of the coupled-back signal to obtain information about the network.

Figure 3:
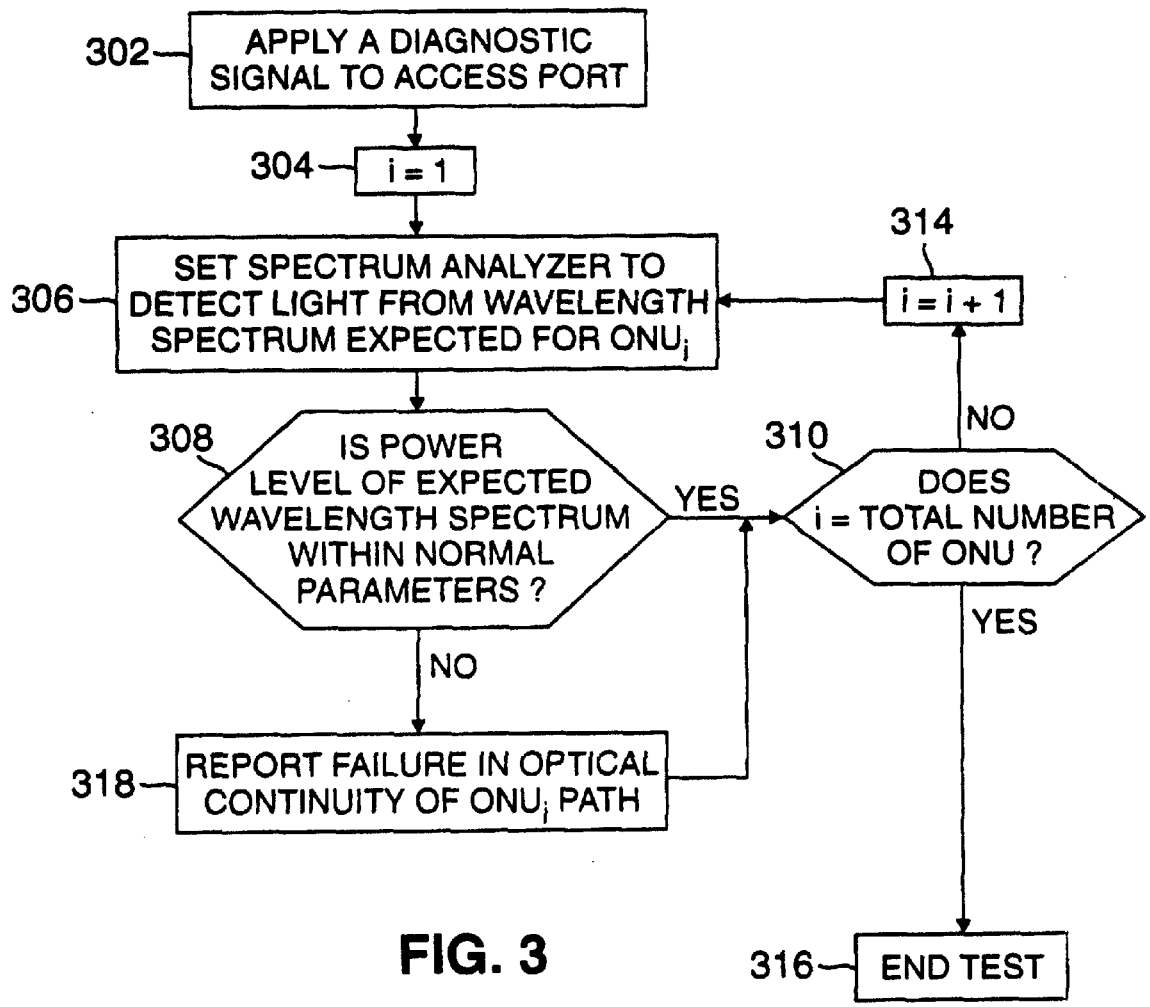
FIG. 3 shows a flow diagram of an exemplary diagnostic operation which may be performed by the passive optical network of FIG. 1 in accordance with the present invention.

FIG. 3 shows a flow diagram 300 of an exemplary optical continuity test that may be performed by the network 10 or a similar network. The test may be performed on a periodic basis while the network 10 is otherwise effecting communications between the central office 13 and the ONUs. The operations of the diagnostics transmitter 30 and receiver 32 are preferably controlled by the diagnostics controller 35. Alternatively, a human operator may provide these or similar control functions.

In step 302, the diagnostics transmitter 30 of FIG. 1 generates a test light signal that is preferably invisible to the ONU receiver 28. For example, as discussed above, if a diagnostic blocking filter 40 is used, the test signal is generated having an optical wavelength that is blocked by the filter 40.

In step 304, the controller 35 sets a counter i equal to 1. The counter i represents an ONU counter. In step 306, the controller 35 configures the diagnostics receiver 32 to analyze signals at a wavelength associated with $ONU_i$. To this end, the diagnostics receiver 32 may include an optical spectrum analyzer. The wavelength associated with $ONU_i$ is determined by the routing properties of the WGR at the remote node 22, which is discussed above.

Once the diagnostics receiver 32 is appropriately configured for $ONU_i$, the controller 35 executes step 308. In step 308, the controller 35 determines whether the optical power of the received light is within normal parameters. The definition of what constitutes normal parameters will depend on the normal loss associated with components that makeup the network, as well as other factors. The normal parameters of operation may readily be determined empirically, theoretically, or by a combination of both, by those of ordinary skill in the art.

If the received light signal is within normal parameters, then, in step 310, the controller 35 determines whether all the ONUs have been tested. If not, then in step 314, the counter i is incremented. After step 314, the diagnostics receiver 32 is reconfigured to analyze signals at the wavelength associated with the next ONU. If, however, all the ONUs have been tested, the test is ended in step 316.

If, in step 308, it is determined that the power of the received light signal is not within normal parameters, then step 318 is executed. In step 318, an optical continuity problem is reported. For example, if no light signal is detected, it may indicate a fiber break. If, however, a low level signal is detected, it may indicate other problems, such as a slight frequency shift in the routing properties of the remote node 22. After the failure is reported, step 310 is executed and the test is continued. Corrective action may then be taken.

The above steps illustrate a general preventative maintenance test that may be performed periodically to ensure the health of the passive optical network 10. Other tests that utilize the benefits of the looped-back optical path may also be employed.

In an alternative method, a similar test may be performed if it is learned that a particular ONU is not communicating. If such a failure is reported for $ONU_C$, then i is set equal to C and steps 302, 306 and 308 are performed. The controller 35 performs these steps to determine if the failure is due to an optical link problem such as a break in one or more fibers, or if the failure is due to an ONU transmitter or receiver problem. In particular, in step 308, if the received light is within normal parameters, then the optical link, including the fiber, is operating properly and the ONU hardware may be at fault. If, however, in step 308, no light is received, then the optical link has a failure.

The present invention thus provides an additional method of testing the continuity of the optical link between a central office and an ONU in a passive optical network. A system operating according to the present invention may perform both OTDR testing and the continuity test described above. The administration of both tests provides more system specific information than would be provided by the OTDR test alone. In particular, if a fault occurs near the ONU, the OTDR test cannot distinguish between an ONU transmitter failure, an ONU receiver failure, or a fiber cut.

There are several variations of the passive optical network 10 that operate according to the present invention, a few examples of which are discussed below.

In one alternative configuration of the passive optical network 10, the diagnostics transmitter 30 and diagnostics receiver 32 may be interchanged such that the transmitter 30 is coupled to the upstream fiber 23 through the access port 33 and the receiver 32 is coupled to the downstream fiber 21 through the access port 31. In this configuration, the diagnostic signals travel in the opposite direction of the communication signals. One drawback associated with this method is that backscattered light from the downstream diagnostic signal may interfere with the upstream communication signals at the central office receiver 16. If, however, the diagnostic signals are transmitted at a different wavelength than the upstream communication signals and a WDM coupler is used as the access port 33, the backscattered diagnostic signal can be routed away from the receiver 16 by the WDM coupler, and should not significantly interfere.

In another alternative configuration, the network 10 is operable to perform the optical continuity test without the diagnostics transmitter 30. In this configuration, the optical continuity is tested by detection of the coupled-back downstream communication signal. In this test, the diagnostics receiver 32 preferably comprises a high sensitivity, low bandwidth wavelength detector that is set to receive signals in the optical wavelength band corresponding to the ONU 26. In operation, the central office 13 transmits a downstream communication signal. A portion of the spectrum of the downstream communication signal is provided to the ONU 26 from the remote node 22 in accordance with the normal first mode of operation of the network 10, discussed above. A portion of the downstream communication signal, however, is coupled back onto the upstream fiber 25 by the coupler 34.

The coupled-back signal is provided to the remote node 22, which, through the properties of the WGR, directs the coupled-back signal to the upstream fiber 23. The signal then propagates upstream to the central office 13 and is directed to the diagnostics receiver 32 by the access port 33. Because the downstream signals and the upstream communication signals occupy different spectrum bands, typically 1.3 $\mu$m and 1.5 $\mu$m, the coupled-back signal may readily be separated from the upstream signals at the access port 33. This alternative embodiment obviates the need for a special diagnostics transmitter 30 as well as the need for the diagnostic blocking filter 40. One drawback of this method is the requirement that the diagnostics receiver 32 be extremely sensitive. This drawback is due to the fact that downstream communication signals, when generated by an LED, will be highly attenuated by the time they are coupled-back to the central office 13.

In yet another alternative of the invention, the diagnostics receiver 32 is not required. In this embodiment, the central office receiver 16 is operable to receive and interpret the coupled-back diagnostic signal. To this end, the diagnostics transmitter 30 provides a low power optical diagnostic signal having a specific wavelength corresponding to the ONU under test. This signal is modulated by an RF tone having a narrow RF bandwidth. The diagnostic signal is then routed by the WGR in the remote node 22 to the ONU under test, for example, the ONU 26. The narrow bandwidth RF tone represents low level noise to the ONU receiver 28 and thus does not affect communication signal reception.

The diagnostic signal is subsequently coupled-back or looped back to the central office 13 and continues to the central office receiver 16. In this embodiment, the circuitry at the central office receiver 16 is operable to process the upstream communication signals as usual while also analyzing the coupled-back diagnostic signal. To this end, a high gain, low bandwidth band pass filter may be used to detect the presence of the RF tone. The presence or absence of the RF tone indicates whether there is optical continuity between the central office 13 and the ONU under test.

Figure 4:
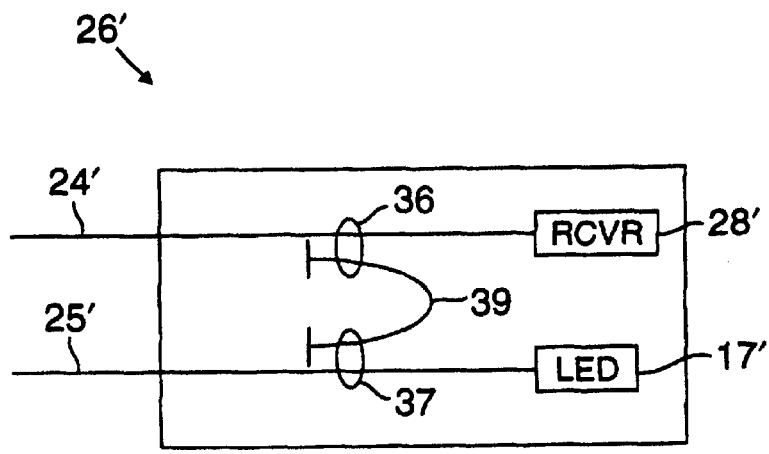
FIG. 4 shows an optical network unit which may be used in the passive optical network of FIG. 1.

In addition to the variations of the central office structure discussed above, the structure of optical network units for use in the system of the present invention may vary. FIG. 4 shows an alternative embodiment of an ONU 26' having a loop-back feature of the present invention. The ONU 26' is configured having a receiver 28' connected to the remote node 22 through a downstream fiber 24' and a transmitter 17' connected to the remote node 22 through an upstream fiber 25'. The ONU 26' includes a first and second coupling devices 36 and 37, respectively and a coupling waveguide 39. The coupling waveguide 39 loops around and then is coupled by the second coupling device 37.

While the ONU 26' of FIG. 4 contains more components than the ONU 26 of FIG. 1, the use of a separate fiber to provide the loop back reduces the potential interference between the ONU transmitter and ONU receiver, and may obviate the need for the reverse blocking filter 41.

It is also noted that the network 10 may further perform diagnostic operations that do not depend on the loop-back feature, but nevertheless exploit the network's use of spectral slicing. For example, the network 10 may perform a diagnostic operation that determines the status of only upstream transmission. In this test, the diagnostic receiver 32 performs analysis using the upstream communication signals. As discussed above, the upstream communication signals contain distinct, interleaved spectral components, each spectral component corresponding to a particular ONU. The diagnostics receiver 32, which may suitably be a wavelength sensitive diagnostic device, such as an optical spectrum analyzer, analyzes the frequency content of the multiplexed upstream communication signal to determine the status of the individual ONUs. Problems associated with a particular ONU's upstream transmission may be detected by examining the optical spectrum corresponding to the ONU, as determined by the WGR 100 in the remote node 22.

In another example of a test that does not require loopback, the network determines the status of downstream transmission. In this test, the diagnostics transmitter 30 and the diagnostics receiver 32 are coupled to the downstream fiber 21. The transmitter 30 transmits a diagnostic signal having an optical spectrum corresponding to a particular ONU but outside the spectrum bands of the upstream and downstream communication signals. The diagnostic signal and/or the diagnostic blocking filter 40 should be chosen such that the diagnostic signal is substantially blocked or reflected. The reflected diagnostic signal then propagates back through the downstream fiber 24 to the remote node 22, where it is multiplexed by the router 100 onto the downstream fiber 21. The reflected signal propagates back through the downstream fiber 21 to the central office 13, where it may be analyzed by the diagnostics receiver 32.

The above-described embodiments of the invention are merely illustrative. Other implementations may readily be devised by those skilled in the art which embody the principles of the invention and fall within the spirit and scope thereof. For example, while 90/10 optical couplers are used in the exemplary ONU 26 of FIG. 1, optical couplers having other ratios, as well as other coupling devices, such as WDM couplers, may readily be used. Furthermore, it is noted that the structure of the optical network as discussed above is completely compatible with tests that do not otherwise require a loop back, such as the OTDR test. Finally, while the illustrative embodiments show a two-fiber configuration to each ONU, those of ordinary skill in the art could readily incorporate the loop-back feature and other features of the present invention into a one-fiber configuration.

We claim:

1. An optical network unit for use in a passive optical network, the optical network unit comprising:

a) a receiver coupled to a downstream fiber for receiving downstream optical signals comprising diagnostic signals from a node which is coupled to the downstream fiber, said diagnostic signals being used to identify and locate network component failures;

b) a transmitter coupled to an upstream fiber for transmitting upstream optical signals to the node which is connected to the upstream fiber; and c) means for optically coupling light from the downstream fiber to the upstream fiber.

2. The optical network unit of claim 1 wherein the transmitter comprises a broadband light source.

3. The optical network unit of claim 1 wherein the transmitter comprises a light emitting diode.

4. The optical network unit of claim 1 wherein the optical coupling means comprises an asymmetric optical coupler.

5. The optical network unit of claim 1 wherein the optical coupling means comprises:

a coupling waveguide;

a first coupler coupling the downstream fiber to the coupling waveguide; and a second coupler coupling the coupling waveguide to the upstream fiber.

6. The optical network unit of claim 1 further comprising a filter.

7. An optical network unit for use in a passive optical network, the optical network unit comprising:
   a) a receiver coupled to a downstream fiber for receiving downstream optical information signals and diagnostic signals having a wavelength that corresponds to the optical network unit, from a node which is coupled to the downstream fiber;
   b) a transmitter coupled to an upstream fiber for transmitting upstream optical signals to the node which is connected to the upstream fiber; and
   c) means for optically coupling the downstream fiber to the upstream fiber.

* * * * *